United States Patent
Taki

(10) Patent No.: US 8,914,336 B2
(45) Date of Patent: Dec. 16, 2014

(54) STORAGE DEVICE AND DATA STORAGE CONTROL METHOD

(75) Inventor: Satoshi Taki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 13/015,696

(22) Filed: Jan. 28, 2011

(65) Prior Publication Data

US 2011/0191396 A1 Aug. 4, 2011

(30) Foreign Application Priority Data

Feb. 3, 2010 (JP) ................................. 2010-022570

(51) Int. Cl.
*G06F 17/30* (2006.01)
*G06F 12/00* (2006.01)

(52) U.S. Cl.
CPC ...................................... *G06F 17/30* (2013.01)
USPC ............................ 707/689; 707/823; 707/825

(58) Field of Classification Search
CPC ................... G06F 17/30067; G06F 17/30194; G06F 17/30221; G06F 17/30224; G06F 17/30286; G06F 17/30312; G06F 17/30091; G06F 3/0611; G06F 3/0643; G06F 3/067
See application file for complete search history.

(56) References Cited

U.S. PATENT DOCUMENTS

| | | | | |
|---|---|---|---|---|
| 5,214,768 | A * | 5/1993 | Martin et al. .................. | 711/114 |
| 5,231,570 | A * | 7/1993 | Lee ................................. | 705/38 |
| 5,404,435 | A * | 4/1995 | Rosenbaum .................. | 715/205 |
| 5,475,834 | A * | 12/1995 | Anglin et al. .................. | 707/695 |
| 5,515,502 | A * | 5/1996 | Wood .............................. | 714/15 |
| 5,530,899 | A * | 6/1996 | MacDonald .................... | 710/17 |
| 5,613,110 | A * | 3/1997 | Stuart ................................... | 1/1 |
| 6,108,697 | A * | 8/2000 | Raymond et al. ............. | 709/218 |
| 6,266,702 | B1 * | 7/2001 | Darnell et al. ................ | 709/236 |
| 6,522,580 | B2 * | 2/2003 | Chen et al. ............... | 365/185.02 |
| 6,658,437 | B1 * | 12/2003 | Lehman ................................. | 1/1 |
| 7,058,772 | B2 * | 6/2006 | Kuwabara et al. ............ | 711/159 |
| 7,606,153 | B2 * | 10/2009 | Nakaya et al. ................ | 370/231 |
| 7,783,737 | B2 * | 8/2010 | Fujino et al. .................. | 709/223 |
| 2002/0174419 | A1 * | 11/2002 | Alvarez et al. ................ | 717/168 |
| 2005/0187985 | A1 * | 8/2005 | Edwards et al. .............. | 707/200 |
| 2006/0179087 | A1 * | 8/2006 | Fujii et al. ..................... | 707/205 |
| 2006/0259686 | A1 * | 11/2006 | Sonobe ......................... | 711/114 |
| 2007/0143380 | A1 * | 6/2007 | Plow et al. .................... | 707/206 |
| 2009/0019443 | A1 * | 1/2009 | Jakob ............................ | 718/102 |
| 2009/0049110 | A1 * | 2/2009 | Plow et al. .................... | 707/206 |
| 2009/0063587 | A1 * | 3/2009 | Jakob ............................ | 707/203 |
| 2009/0228655 | A1 * | 9/2009 | Yamane ........................ | 711/117 |

FOREIGN PATENT DOCUMENTS

| | | |
|---|---|---|
| JP | 2006-215954 A | 8/2006 |
| JP | 2007-141089 A | 6/2007 |

* cited by examiner

*Primary Examiner* — Daniel Kuddus
(74) *Attorney, Agent, or Firm* — Fujitsu Patent Center

(57) ABSTRACT

A storage device comprising a plurality of file systems, a data restructuring unit, an area calculator for calculating a free space in the file system in which the relocation is performed and the data has been stored by the data restructuring unit, a data extraction unit for extracting data that is able to be stored in the free space from a plurality of data that has not been stored in the file systems in which the relocation is completed or the file system in which the relocation is performed, the extracting data having the largest size among the plurality of data to be stored in the free space, and a data re-storing unit for storing the data extracted by the data extraction unit in the free space.

2 Claims, 6 Drawing Sheets

FIG. 2

| ARCHIVE ID | DATE OF ARCHIVE | STORAGE PERIOD | MACHINE NAME/ LOGIN NAME OF ARCHIVE SOURCE | ARCHIVE FILE NAME | ARCHIVE POSITION | FILE SIZE |
|---|---|---|---|---|---|---|
| 1 | 12/1/2009 | 1/31/2010 | host01/User01 | arc01 | FS1 | 10MB |
| ... | ... | ... | ... | ... | ... | ... |

STORAGE DEVICE AND DATA STORAGE CONTROL METHOD

CROSS REFERENCE TO RELATED APPLICATION

This application is based upon and claims the benefit of priority from the prior Japanese Patent Application NO. 2010-022570 filed on Feb. 3, 2010, the entire contents of which are incorporated herein by reference.

FIELD

The embodiments discussed herein related to a storage device and a data storage control method.

BACKGROUND

An archive-type (recordable-type) storage system (hereinafter referred to as "archive storage system") is used as a device for collectively storing contents, which are data that need not be updated, such as images.

A disk array area, which is a storing destination of the contents in the archive storage system, is formed by a plurality of file systems, which are storage devices such as hard disks. When the archive storage system receives a content storage request from a host such as a server or a client device, the archive storage system writes contents to a file system in the receiving order. When the archive storage system may not write the next content because the free space in the file system to which the contents are written decreases, the archive storage system writes the content and the following contents received after the content to another new file system.

As depicted in FIG. 6, an archive storage system including a four file systems FS1, FS2, FS3, and FS4 will be described as an example. FIG. 6 is a diagram depicting an example of a conventional archive storage system. As depicted in FIG. 6, the archive storage system stores contents received from a host in the file systems in order from FS1 to FS 4. When a content e is stored, if FS1 has no area in which the next content f is stored, the archive storage system stores the content f in the next file system FS2. Further, when a content j is stored, if FS2 has no area in which the next content k is stored, the archive storage system stores the content k in the next file system FS3. Further, when a content o is stored, if FS3 has no area in which the next content p is stored, the archive storage system stores the content p in the next file system FS4. In this way, the archive storage system writes contents, for which a write request is received from the host, to the file systems.

Japanese Laid-open Patent Publication No. 2006-215954 and Japanese Laid-open Patent Publication No. 2007-141089 are examples of related art.

However, in the conventional art, there is a problem that many useless free spaces that are not used are generated on the file systems. For example, the problem will be described using FIG. 6 as an example. It is assumed that, when the content e is stored, FS1 has 10 MB of free space, and the size of the content f that is a content to be stored next is 11 MB. In this case, even though FS1 is short by only 1 MB to store the content f, the content f is stored in the next file system FS2. Hence, the 10 MB in FS1 will be a useless free space.

Such a situation also occurs in FS2, FS3, and FS4, and a useless free space that is not used is generated on each file system. Therefore, in the entire file systems, there are large amounts of useless spaces, and thus the file systems may not be used efficiently.

SUMMARY

According to one aspect of the embodiments, a storage device in this specification include an additional data storing unit for additionally storing data in a plurality of file systems included in a disk array device. Further, the storage device and the data storage control method include a data storing unit for, when performing relocation of data stored in the plurality of file systems, until when the relocation in each of the plurality of file systems is completed, selecting a file system in which the relocation has not been performed from the plurality of file systems as a file system in which the relocation is performed and storing data to be stored in the file system in which the relocation has not been performed in the file system in which the relocation is performed in a predetermined order. Further, the storage device and the data storage control method include an area calculator for calculating a free space in the file system in which the relocation is performed and data has been stored by the data storing unit. Further, the storage device and the data storage control method include a data extraction unit for extracting data that may be stored in the free space calculated by the area calculator from data that has not been stored in the file systems in which the relocation is completed or the file system in which the relocation is performed. Further, the storage device and the data storage control method include a data re-storing unit for storing data extracted by the data extraction unit in the free space.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

BRIEF DESCRIPTION OF DRAWINGS

FIG. 2 is a diagram depicting an example of information stored in a management information DB.

DESCRIPTION OF EMBODIMENTS

Hereinafter, embodiments of the storage device and the data storage control method disclosed in this application will be described in detail with reference to the drawings. These embodiments do not limit the present invention.

First Embodiment

System Configuration

Figure 1:
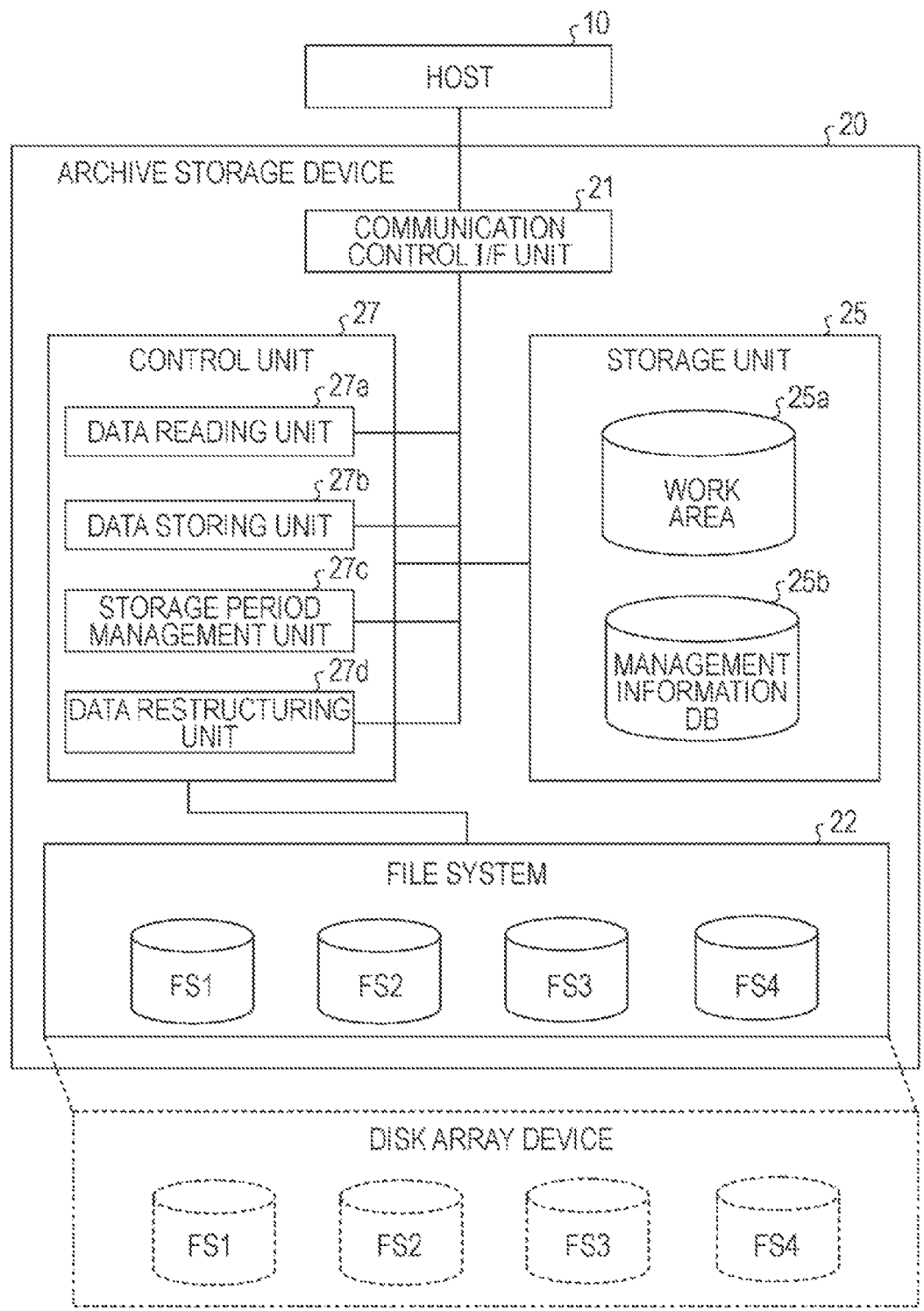
FIG. 1 is a block diagram depicting a configuration of an archive storage system according to a first embodiment.

FIG. 1 is a block diagram depicting a configuration of the archive storage system according to the first embodiment. As depicted in FIG. 1, in the archive storage system, a host 10 and an archive storage device 20 are connected to each other via a Fibre Channel or the like. The host 10 is a server or a personal computer that stores and reads contents (archive data) that need not be updated, such as image data, to and from the archive storage device 20.

The archive storage device 20 is a storage device for additionally storing archive data that need not be updated, such as image data, received from the host 10. As depicted in FIG. 1, the archive storage device 20 includes a communication control I/F 21, a file system 22, a storage unit 25, and a control unit 27.

The communication control I/F 21 is an interface which connects to the host 10 via, for example, Fibre Channel, and controls communication with the host 10. For example, the communication control I/F 21 receives an archive request indicating a storage request of image data from the host 10 or transmits a result of archive performed by the archive storage device 20 to the host 10.

The file system 22 is, for example, a RAID (Redundant Arrays of Inexpensive Disks), which combines a plurality of file systems to manage them as a single file system and stores image data or the like as archive data that need not be updated. For example, the file system 22 includes a disk array device in which file systems FS1, FS2, FS3, and FS4 are combined into a single file system. The number of file systems illustrated here is just an example, and it is not limited to this.

The storage unit 25 is a storage device such as a semiconductor memory chip or a hard disk, which stores data and program that are requested for various processing by the control unit 27 and includes a work area 25*a* and a management information DB 25*b*. The storage unit 25 stores user name and password in association with each other, which are information of a user who uses the archive storage device 20. For example, the storage unit 25 stores "U001, PASS01" as "user name, password".

The work area 25*a* is a temporary area used when the control unit 27 stores data in and reads data from the file system 22. For example, the work area 25*a* holds content received by the communication I/F unit 21 along with an archive request until the content is stored in the file system 22. Archive data or the like temporarily hold in the work area 25*a* is deleted by the control unit 27.

The management information DB 25*b* stores information related to contents stored in the file system 22. For example, as depicted in FIG. 2B, the management information DB 25*b* stores "archive ID, date of archive, storage period, machine name/login name of archive source, archive file name, archive position, and file size". As an example, the management information DB 25*b* stores "1, Dec. 1, 2009, Jan. 31, 2010, host01/User01, arc01, FS1, and 10 MB". FIG. 2 is a diagram depicting an example of information stored in the management information DB.

The "archive ID" stored in the management information DB is information that uniquely identifies data archived (stored) in the file system 22, and the "date of archive" is the date when the data was stored in the file system 22 for the first time. The "storage period" is a storage expiration date obtained by adding the number of storage days determined depending on the type of content, such as three years for image data, to the date of archive. The "machine name/login name of archive source" is information that identifies a transmission source of the archived content, and is, for example, information obtained when user authentication is performed. The "archive file name" is the name of the content archived in the file system 22. The "archive position" is information indicating a physical area on the disk array included in the file system 22 in which the archive data is stored. The "file size" is information indicating the size of the archived content. The "archive position" is updated by restructuring processing of a data restructuring unit 27*d* described below.

The management information DB 25*b* stores management information of FS such as the size of each FS included in the file system 22. For example, the management information DB 25*b* stores "FS1, 20 GB, 18 GB, 2 bytes, target" as "the size (capacity) of FS, the current size of stored contents, the current size of free space, current write target" for each FS. When the "current write target" is "target", it is indicated that the FS is a write target, and when the "current write target" is "–", it is indicated that the FS is not a write target.

The control unit 27 is an electronic circuit such as, for example, a CPU (Central Processing Unit) or an MPU (Micro Processing Unit). The control unit 27 includes an internal memory for storing a control program such as OS (Operating System), a program specifying various processing procedures, and data that are requested. Further, the control unit 27 includes a data reading unit 27*a*, a data storing unit 27*b*, a storage period management unit 27*c*, and a data restructuring unit 27*d*, and performs various processing by using these units.

When the data reading unit 27*a* receives a content read request from the host 10, the data reading unit 27*a* reads content corresponding to the request from the file system 22 and transmits the content to the host 10. For example, first, the data reading unit 27*a* performs user authentication by causing the host 10 to input a user name and a password. Next, the data reading unit 27*a* receives a content read request from the host 10, and obtains the "archive file name" and the "archive position" corresponding to an archive ID included in the read request from the management information DB 25*b*. Then, the data reading unit 27*a* reads the "archive file name" from the "archive position" obtained from the management information DB 25*b*, and transmits the "archive file name" to the host 10.

When the data storing unit 27*b* receives a content storage request from the host 10, the data storing unit 27*b* stores a content to be stored in the file system 22. For example, first, the data storing unit 27*b* performs user authentication by causing the host 10 to input a user name and a password. Next, the data storing unit 27*b* receives a content from the host 10, stores the content in the work area 25*a*, and assigns a unique "archive ID" to the content. Next, the data storing unit 27*b* determines whether or not the content may be written to a write target FS from the size of free space in the FS which is currently a write target destination in the file system 22 and the size of the write target archive data. When the data storing unit 27*b* determines that there is a free space, in other words, determines that the content may be written to the write target FS, the data storing unit 27*b* determines the FS to be the write destination. When there is no free space, the data storing unit 27*b* performs the same determination on the next FS.

The data storing unit 27*b* which determines the write target destination FS writes the content to be written to the determined FS. Thereafter, the data storing unit 27*b* stores the assigned "archive ID", "time of archive, machine information of archive source, archive file name, archive position, file size", and the like in the management information DB in association with the content. Further, the data storing unit 27*b* determines a storage period according to the type of the stored content, and stores a storage expiration date in "storage period". Thereafter, the data storing unit 27*b* transmits the assigned archive ID to the host 10 along with a content storage completion notice.

Here, the calculation of the storage period will be described in detail. For example, it is assumed that the data storing unit 27*b* determines that the content storage date in the file system is Jan. 1, 2009, the stored content is image data, and the storage period is three years. In this case, the data storing unit 27b determines that the "storage period" is "Jan. 1, 2012", and stores the "storage period" of "Jan. 1, 2012" in the management information DB 25b.

The storage period management unit 27c manages the contents stored in the file system 22. For example, the storage period management unit 27c periodically refers to the management information DB 25b, and deletes a content whose "storage period" expires from the file system 22. Then, the storage period management unit 27c transmits the "archive ID" of the deleted content to the host which archived the content to inform that "the content was deleted due to storage period expiration".

The storage period management unit 27c may ask the host 10 whether or not the content is to be deleted before deleting the content. For example, the storage period management unit 27c notifies the host which archived the content whose storage period expires that the content will be deleted. When the storage period management unit 27c receives a deletion permission response from the host which archived the content, the storage period management unit 27c deletes the content from the file system 22. When the storage period management unit 27c receives a storage period extension response from the host which archived the content, the storage period management unit 27c extends the "storage period" of the content.

Figure 3:
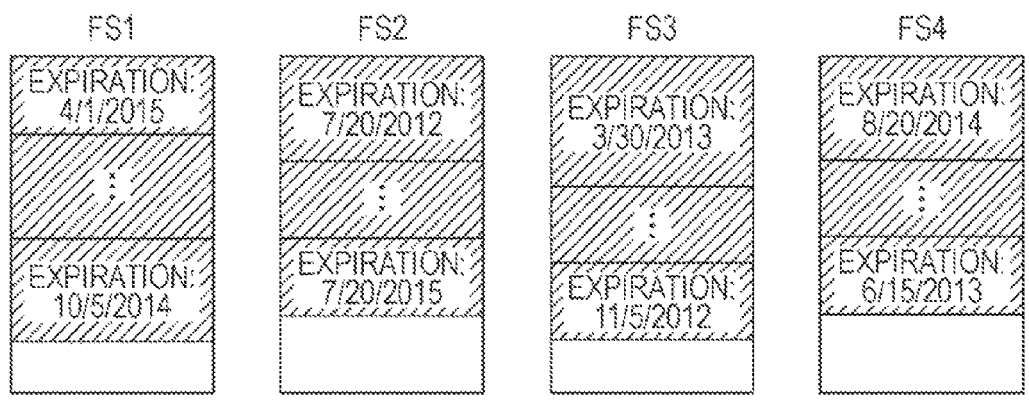
FIG. 3 is a diagram depicting an example of relocation of contents.
Figure 3:
Figure 3:
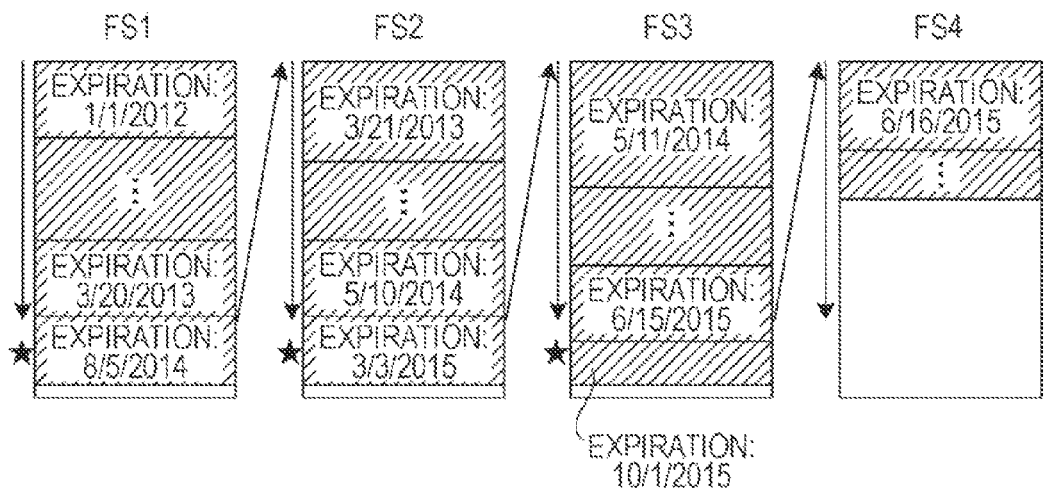

The data restructuring unit 27d relocates contents stored in the file system 22 and restructures the data in the entire disk array. The data restructuring unit 27d restructures the storage state of a file system in which contents have been written by the data storing unit 27b and which is no longer a content write destination. For example, as depicted in FIG. 3, the data restructuring unit 27d relocates the contents in FS1 to FS4 of the file system 22 in ascending order of the expiration date of storage period. Next, the data restructuring unit 27d sequentially stores contents in FS1 in ascending order of the expiration date of storage period. In this case, the data restructuring unit 27d updates "archive positions" corresponding to written contents in the management information stored in the management information DB 25b. Here, the data restructuring unit 27d stores "FS1" in the "archive positions" corresponding to the written contents.

When the next content may not be stored in the free space in FS1, the data restructuring unit 27d selects a content having a largest size that may be stored in the free space in FS1 from all the contents that have not been stored yet and stores the content in the free space in FS1. For example, the data restructuring unit 27d sums up the sizes ("file sizes") of contents where "FS1" is stored in "archive position" in the management information stored in the management information DB 25b. Then, the data restructuring unit 27d subtracts "the summed up file size" from "the size of FS" to calculates the free space of FS1. The data restructuring unit 27d refers to the "file sizes" of contents where "FS1" is not stored in "archive position" in the management information stored in the management information DB 25b, selects a content having a largest size that may be stored in the free space in FS1, and stores the content in the free space in FS1.

Thereafter, if there is no content that may be stored in the calculated free space in FS1, the data restructuring unit 27d performs restructuring of FS2. In this case, the data restructuring unit 27d calculates the total size of the contents stored in "FS1" in the same manner as described above, and stores the total size as "the current size of stored contents" of FS1 of the management information DB 25b. Further, the data restructuring unit 27d stores a value obtained by subtracting "the current size of stored contents" from "the size of FS" of FS1 of the management information DB 25b as "the current size of free space" of FS1 of the management information DB 25b. Further, the data restructuring unit 27d updates "current write target" of FS1 of the management information DB 25b from "target" to "–", and updates "current write target" of FS2 of the management information DB 25b from "–" to "target". Thereafter, the data restructuring unit 27d performs the same processing as that performed on FS1 described above on FS2. In this case, the data restructuring unit 27d defines contents where "FS1" is not stored in "archive position" in the management information stored in the management information DB 25b as contents to be restructured. The data restructuring unit 27d also performs restructuring processing on the file systems FS 3 and FS4 in the same manner as on the file system FS1.

As depicted in FIG. 3, the content of expiration date Mar. 20, 2013 is to be stored next to the content of expiration date Mar. 20, 2013. However, the free space in FS1 at the time point when the content of expiration date Mar. 20, 2013 is stored is smaller than the content of expiration date Mar. 21, 2013 that is to be stored next, so that the content of expiration date Mar. 21, 2013 may not be stored. Therefore, the data restructuring unit 27d stores the content of expiration date Aug. 5, 2014 having a largest size that may be stored in the free space in FS1 at the time point when the content of expiration date Mar. 20, 2013 is stored among contents that have not been stored yet. At this time point, if further there is a free space in FS1 and there are contents that may be stored in the free space, the data restructuring unit 27d stores a content having a largest size among the contents that may be stored.

Then, the data restructuring unit 27d sequentially stores contents, which have not been stored yet including the content of expiration date Mar. 21, 2013 that could not be stored in FS1, in FS2 in ascending order of the expiration date of storage period. Thereafter, the same storage procedure as that performed on FS1 described above is performed on FS2 to FS4. FIG. 3 is a diagram depicting an example of relocation of contents.

The data restructuring unit 27d generates (copies) the same configuration as that of FS1 to FS4 in the file system 22 in the work area 25a. Here, FS1 to FS4 in the work area 25a are respectively referred to as sFS1 to sFS4. The data restructuring unit 27d relocates the contents stored in sFS1 to sFS4 in ascending order of the expiration date of storage period. In other words, the data restructuring unit 27d relocates the contents in FS1 to FS4 in the file system 22 in ascending order of the expiration date of storage period.

Next, the data restructuring unit 27d sequentially stores the contents of sFS1 to sFS4 relocated in ascending order of the expiration date of storage period in FS1 of the file system 22 in ascending order of the expiration date of storage period. Then, the data restructuring unit 27d stores "FS1" in the "archive positions" in the management information stored in the management information DB 25b in association with the written contents. The data restructuring unit 27d calculates the free space in FS1 in the manner described above each time the data restructuring unit 27d stores a content in FS1.

When the next content may not be stored in the free space in FS1, the data restructuring unit 27d stores a content having a largest size that may be stored in the free space among the contents that have not been stored yet. In other words, when the content having expiration date immediately after the expiration date of the content that has been stored most recently may not be stored, the data restructuring unit 27d stores a content having a largest size that may be stored in the free space among the contents that have not been stored yet. The data restructuring unit 27*d* refers to "file size" of the contents where "FS1" is not stored in "archive position" in the management information stored in the management information DB 25*b* among the contents in sFS1 to sFS4. Thereafter, the data restructuring unit 27*d* selects a content having a largest size that may be stored in the free space in FS1 from the contents in sFS1 to sFS4, stores the content in the free space in FS1, and updates the management information DB 25*b*.

In summary, the data restructuring unit 27*d* sequentially stores the contents in FS in ascending order of the expiration date of storage period, and when the next content that is to be stored may not be stored in the free space, the data restructuring unit 27*d* does not stores the content but stores a content having a largest size that may be stored in the free space among the contents that have not been stored yet. The data restructuring unit 27*d* performs the above-described processing on all of FS1 to FS4, and when the relocation of all the contents is completed, the data restructuring unit 27*d* deletes sFS1 to sFS4 generated in the work area 25*a*.

Processing Flow

Figure 4:
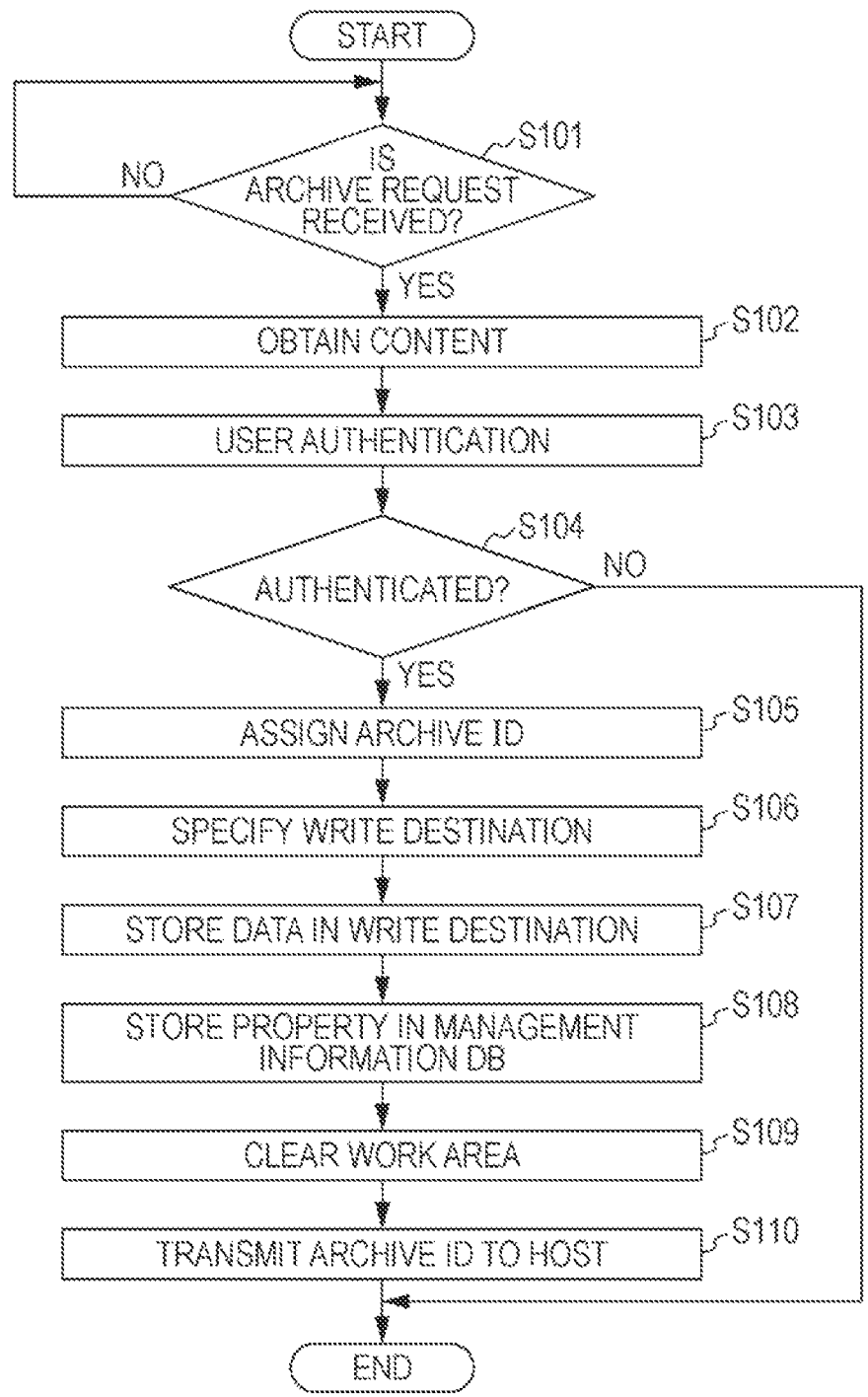
FIG. 4 is a flowchart depicting a flow of archive processing in an archive storage device according to the first embodiment.
Figure 5:
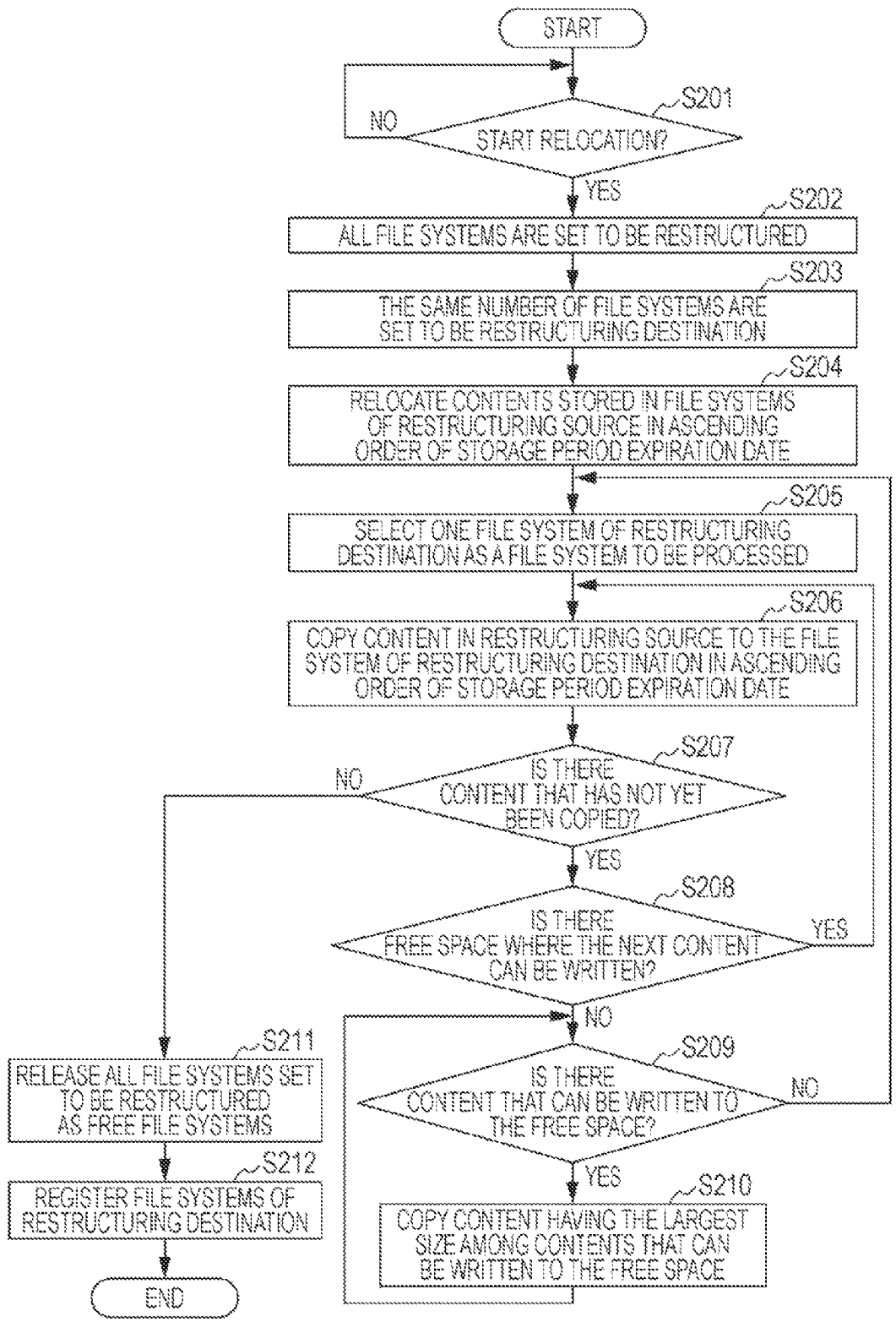
FIG. 5 is a flowchart depicting a flow of relocation processing in the archive storage device according to the first embodiment.
Figure 6:
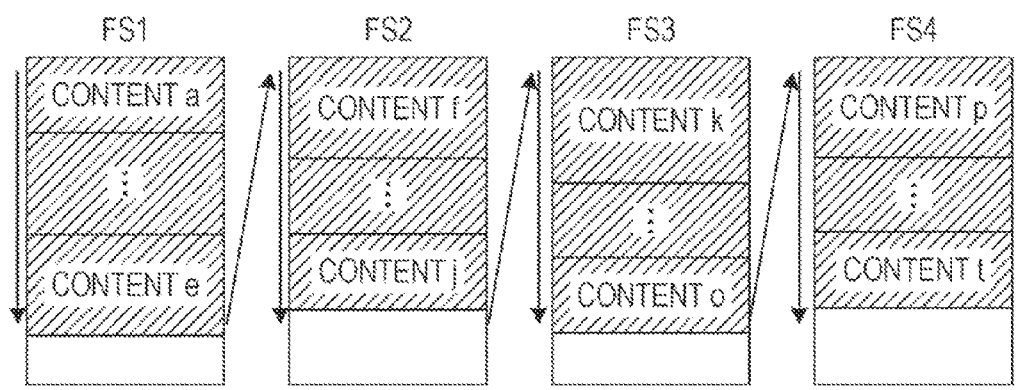
FIG. 6 is a diagram depicting an example of a conventional archive storage system.

Next, a processing flow in the archive storage device according to the first embodiment will be described with reference to FIGS. 4 and 5. FIG. 4 is a flowchart depicting a flow of archive processing in the archive storage device according to the first embodiment, and FIG. 5 is a flowchart depicting a flow of relocation processing in the archive storage device according to the first embodiment.

Flow of Archive Processing

As depicted in FIG. 4, when the data storing unit 27*b* in the archive storage device 20 receives an archive request from the host 10 (step S101: Yes), the data storing unit 27*b* obtains a content to be stored in the file system 22 from the archive request (step S102).

Next, the data storing unit 27*b* performs user authentication by requesting the host 10 to input a user name and a password by web or the like (step S103). When the user authentication is not allowed, in other words, when the user name or the password is not registered in the storage unit 25 (step S104: No), the data storing unit 27*b* rejects the archive request and ends the processing.

On the other hand, when the data storing unit 27*b* allows the user authentication (step S104: Yes), the data storing unit 27*b* stores the received content in the work area 25*a* and assigns a unique "archive ID" to the content (step S105). Next, the data storing unit 27*b* sequentially refers to FS1 to FS4 in the file system 22, determines whether or not there is a free space in the FS that is the write target destination, and determines the write destination (step S106).

Thereafter, the data storing unit 27*b* stores the content stored in the work area 25*a* in the determined write destination (step S107). Next, the data storing unit 27*b* stores property of "archive ID, date of archive, storage period, machine name/login name of archive source, archive file name, archive position, and file size" in the management information DB 25*b* (step S108).

Then, the data storing unit 27*b* deletes the content stored in the work area 25*a* (step S109), transmits the "archive ID" assigned to the content that is newly stored in the file system 22 to the host 10 (step S110), and ends the processing.

Flow of Relocation Processing

As depicted in FIG. 5, when the start of restructuring is triggered (step S201: Yes), the data restructuring unit 27*d* determines all file systems in which contents are stored to be restructured (step S202). The data restructuring unit 27*d* determines file systems, the number of which is the same as the number of the file systems in which contents are stored, to be a restructuring destination (step S203). For example, the data restructuring unit 27*d* generates a copy of FS1 to FS4 of the file system 22 in the work area 25*a*, and sets FS1 to FS4 of the file system 22 to be restructured.

Next, the data restructuring unit 27*d* relocates the contents stored in the file systems of restructuring source in ascending order of the expiration date of storage period (step S204). For example, the data restructuring unit 27*d* relocates the contents stored in the copy of FS1 to FS4 of the file system 22 generated in the work area 25*a* in ascending order of the expiration date of storage period.

Then, the data restructuring unit 27*d* selects one file system of restructuring destination as a file system to be processed (step S205). For example, the data restructuring unit 27*d* selects FS1 in the file system 22 as a first restructuring destination.

Next, the data restructuring unit 27*d* copies the contents of the restructuring source to the file system in the restructuring destination in ascending order of the expiration date of storage period (step S206). For example, the data restructuring unit 27*d* sequentially stores the contents in FS in ascending order of the expiration date of storage period.

When there is a content that has not yet been copied in the restructuring source (step S207: Yes), the data restructuring unit 27*d* determines whether or not there is a free space in which the next content may be written in the file system in the restructuring destination (step S208). For example, the data restructuring unit 27*d* determines whether or not the next content may be stored in the free space in the FS in which contents are written in ascending order of the expiration date of storage period.

When there is a free space in which the next content may be stored in the file system in the restructuring destination (step S208: Yes), the data restructuring unit 27*d* returns to step S206 and performs processing of step S206 and the following steps.

On the other hand, when there is no free space in which the next content may be stored in the file system in the restructuring destination (step S208: No), the data restructuring unit 27*d* determines whether or not there is a content that may be stored in the free space (step S209). For example, the data restructuring unit 27*d* determines whether or not there is a content that may be stored in the free space in FS1 among all data that have not yet been stored in the FS in the restructuring destination.

When there is a content that may be stored in the free space (step S209: Yes), the data restructuring unit 27*d* copies a content having a largest size that may be stored in the free space to the FS in the restructuring destination (step S210) and performs processing of step S209. On the other hand, when there is no content that may be stored in the free space (step S209: No), the data restructuring unit 27*d* returns to step S205 and performs the processing of step S205.

On the other hand, in step S207, when there is no content that has not yet copied in the restructuring source (step S207: No), the data restructuring unit 27*d* releases all file systems in the restructuring source set to be restructured as free file systems (step S211). Next, the data restructuring unit 27*d* registers the file systems in the restructuring destination, in which the restructuring processing is completed, as file systems of the archive storage device 20 and ends the processing (step S212).

For example, the data restructuring unit 27*d* releases the copy of FS1 to FS4 generated in the work area 25*a* by deleting the copy, and configures the disk array device with the FS1 to FS4 in the file system 22 in which the restructuring processing is completed.

Effects of First Embodiment

As described above, according to the first embodiment, the free space in each file system is minimized, and most of the free space is included in one file system, so that it is possible to reduce useless free spaces that are not used. Also, the useless free spaces are reduced and a limited disk area may be used as much as possible. In a conventional method, although contents whose storage period expires are deleted, the deleted data are distributed in each file system. On the other hand, in the present application, although data of contents whose storage period expires is useless and the contents are deleted, the free spaces generated by the deletion are also continuous because the contents were arranged in ascending order, so that it is possible to reduce useless free spaces that are not used.

Also, it is possible to prevent free spaces from being distributed in many file systems, so that useless free spaces may be minimized. For example, if free spaces are distributed in many file systems and the size of one free space is small, the possibility that a content may be written to the free space becomes small. For example, when a content of 8 MB is desired to be written, if there is a continuous free space of 10 MB as in the present application, the content may be written. In a conventional method, there may be free spaces each of which has a size of 5 MB, and the content may not be written.

It may be considered a method in which one content is divided and written. However, when the number of divided storages increases, the amount of processing of OS increases and the amount of movement of drive head increases, so that read/write speed decreases. Therefore, when the present application is used, it is possible to prevent the amount of processing of OS from increasing and realize a reduction of useless free spaces.

Second Embodiment

Although the embodiment of the present invention has been described, the present invention may be implemented in various forms other than the embodiment described above. Thus, the different embodiments will be described below.

Execution Trigger of Restructuring

As an execution trigger of the restructuring processing disclosed in this application may be arbitrarily set, such as, for example, being triggered by an instruction from an administrator, or being executed periodically such as at 0:00 o'clock every day. The restructuring processing may be executed in a period of time when the device is less frequently used (in the middle of the night, or the like) so that the restructuring processing does not affect other operations.

Setting of Storage Period

In the archive storage device disclosed in this application, the storage period may be specified according to the type of the content. For example, the storage period may be arbitrarily set, such as, three years for A-type image content, five years for B-type audio content, and ten years for C-type other content. The expiration date of storage period of content is determined by the date when the content is written and the storage period determined for the content.

Other Restructuring Method

Although, in the first embodiment, the restructuring processing is performed after the contents in the restructuring source are relocated in ascending order of the expiration date of storage period, it is not limited to this. For example, the restructuring processing may be performed as-is without relocating the contents in the restructuring source in ascending order of the expiration date of storage period. Although, in the restructuring processing of this application, an example is described in which contents are sequentially stored in the file system in the restructuring destination in ascending order of the expiration date of storage period, it is not limited to this.

For example, by considering the size of each content, the contents may be selected and stored in the file systems so that the contents may be almost fully stored in the file systems. Also, it is possible to select a content that may be stored a free space in a file system where the data storage is completed from contents that have not yet been stored, and store the selected content in the free space.

System

Among the processes described in the embodiments, all or part of the processes described to be automatically performed may be manually performed. Or, all or part of the processes described to be manually performed may be automatically performed with publicly known methods. The processing procedures, control procedures, and specific names described in the above document and the drawings, for example, information including various data and parameters depicted in FIG. 2 or the like, may be arbitrarily modified unless otherwise specified.

The constituent elements of the devices depicted in the drawings are functionally conceptual, and need not necessarily be physically configured as depicted in the drawings. In other words, specific forms of distribution and integration of the devices are not limited to those illustrated in the drawings, such as, for example, the data reading unit 27a and the data storing unit 27b may be integrated together. For example, all or part of the devices may be functionally or physically distributed or integrated in arbitrary units according to various loads and the state of use. Moreover, all or an arbitrary part of the processing functions performed in each device may be realized by a CPU and a program analyzed and executed by the CPU, or may be realized as hardware by wired logic.

Program

The data storage control method described in the embodiments may be achieved by causing a computer such as a personal computer or a workstation to execute a program prepared in advance. The program may be distributed via a network such as the Internet. The program may be stored in a computer-readable recording medium, such as a hard disk, a flexible disk (FD), a CD-ROM, an MO, and a DVD, and may be executed by being read from the recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

The invention claimed is:

1. A storage device comprising:
   a plurality of file systems included in a disk array device for storing data, the plurality of file systems each including a plurality of data, the plurality of data each having expiration date of storage period,
   a memory; and
   a processor to perform:
      storing all of the plurality of data stored in the plurality of file systems into the memory;
      setting the plurality of file systems to be restructured,
      relocating all of the plurality of data stored in the memory in ascending order of the expiration date of storage period of the data, selecting a file system from the plurality of file systems, calculating a free space in the selected file system, selecting one of the relocated plurality of data in ascending order of the expiration date of storage period of the data, determining whether a size of the selected one of the relocated plurality of data is less than or equal to a size of the calculated free space of the selected file system, storing the selected one of the relocated plurality of data in ascending order of the expiration date of storage period of the data into the selected file system, when determining that the size of the selected one of the relocated plurality of data is less than or equal to the size of the calculated free space of the selected file system, determining whether there is another one of the relocated plurality of data, which is not stored in the selected file system, having a size that is less than or equal to the size of the calculated free space of the selected file system, when determining that the size of the selected one of the relocated plurality of data is more than the size of the calculated free space of the selected file system, the another one of the relocated plurality of data having a largest size among the relocated plurality of data to be stored in the calculated free space of the selected file system, storing the another one of the relocated plurality of data into the selected file systems, when determining that there is the another one of the relocated plurality of data having a size that is less than or equal to a size of the calculated free space of the selected file system, selecting another file system from the plurality of file systems when determining that there is not the another one of the relocated plurality of data having a size that is less than or equal to a size of the calculated free space of the selected file system, and storing the selected one of the relocated plurality of data into the another file system in ascending order of the expiration date of storage period of the data.

2. A computer-implemented data storage control method comprising:

storing, using a processor, data in a plurality of file systems included in a disk array device, the plurality of file systems each including a plurality of data, the plurality of data each having expiration date of storage period;

storing, using the processor, all of the plurality of data stored in the plurality of file systems into a memory setting, using the processor, the plurality of file systems to be restructured;

relocating, using the processor, all of the plurality of data stored in the memory in ascending order of the expiration date of storage period of the data;

selecting, using a processor, a file system from the plurality of file systems calculating, using the processor, a free space in the selected file system selecting, using the processor, one of the relocated plurality of data in ascending order of the expiration date of storage period of the data;

determining, using the processor, whether a size of the selected one of the relocated plurality of data is less than or equal to a size of the calculated free space of the selected file system;

storing, using the processor, the selected one of the relocated plurality of data in ascending order of the expiration date of storage period of the data into the selected file system, when determining that the size of the selected one of the relocated plurality of data is less than or equal to the size of the calculated free space of the selected file system;

determining, using the processor, whether there is another one of the relocated plurality of data, which is not stored in the selected file system, having a size that is less than or equal to the size of the calculated free space of the selected file system, when determining that the size of the selected one of the relocated plurality of data is more than the size of the calculated free space of the selected file system, the another one of the relocated plurality of data having a largest size among the relocated plurality of data to be stored in the calculated free space of the selected file system;

storing, using the processor, the another one of the relocated plurality of data into the selected file systems, when determining that there is the another one of the relocated plurality of data having a size that is less than or equal to a size of the calculated free space of the selected file system;

selecting, using the processor, another file system from the plurality of file systems when determining that there is not the another one of the relocated plurality of data having a size that is less than or equal to a size of the calculated free space of the selected file system; and storing, using the processor, the selected one of the relocated plurality of data into the another file system in ascending order of the expiration date of storage period of the data.

* * * * *